United States Patent Office 3,258,691
Patented June 28, 1966

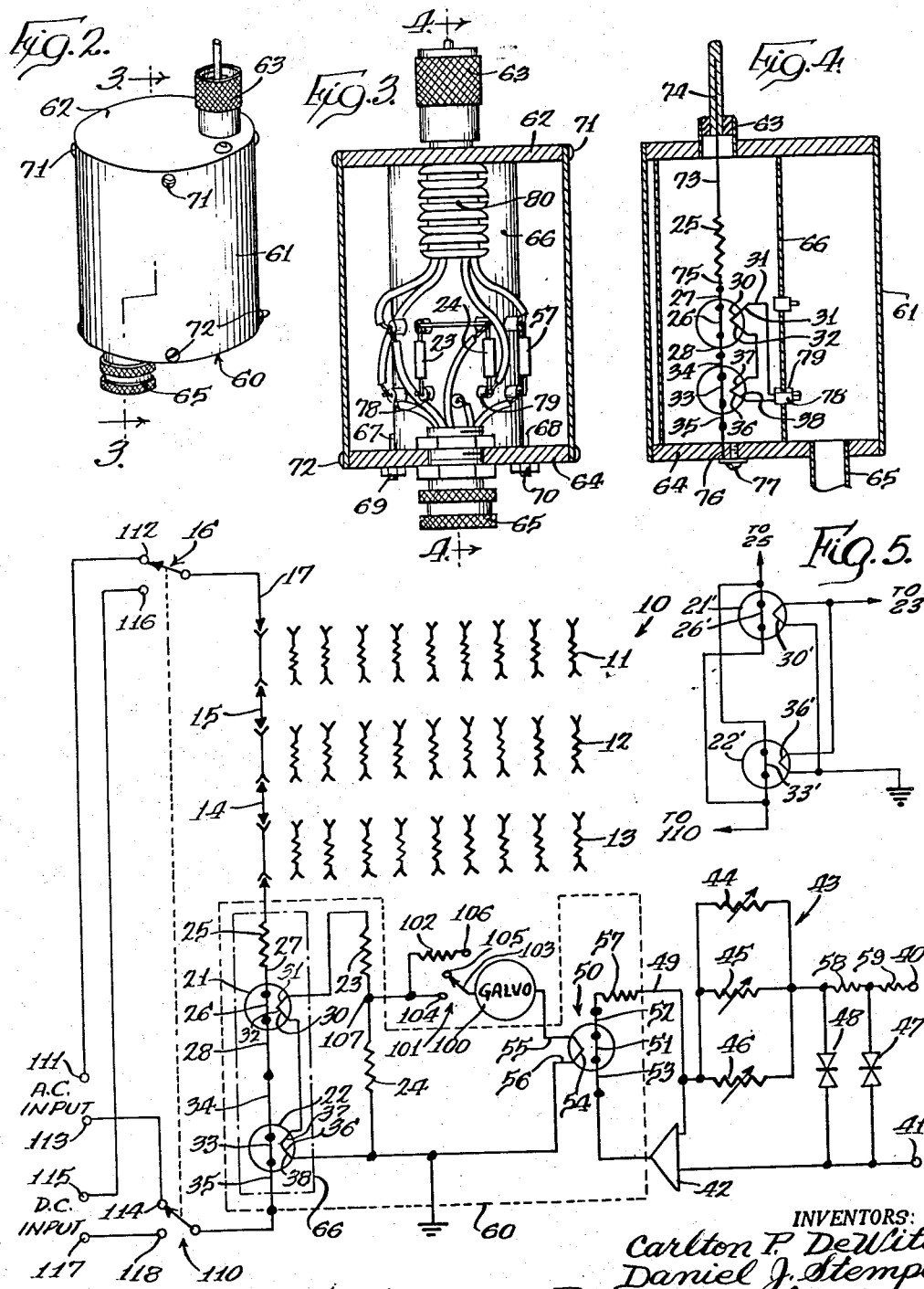

3,258,691
CONVERTER WITH COMPENSATION FOR THERMAL REVERSE D.C. CURRENT ERROR
Carlton P. De Witt and Daniel J. Stemper, both of Oconto, Wis., assignors to Holt Hardwood Company, a corporation of Wisconsin
Filed July 26, 1961, Ser. No. 126,965
5 Claims. (Cl. 324—106)

The present invention relates to thermal transfer voltmeters and more particularly to a thermal transfer voltage standard of increased accuracy.

Scientific advancements have brought about a need for many accurate voltage measuring instruments. To meet this need the thermal transfer voltmeter was developed. Its operation consists of placing an A.C. voltage across a thermal resistance element which is heat transfer coupled to a thermocouple, of using a galvanometer as an indicator and of using a D.C. voltage source for manually balancing the voltage produced by the thermocouple across the galvanometer. Once the galvanometer is balanced, the A.C. source is disconnected from the thermal resistor and another D.C. source is connected and varied in voltage until the galvanometer is once against balanced. Then the voltage of this D.C. source is carefully measured for it is equivalent to the R.M.S. (root mean square) value of the A.C. source. The combination of the thermal resistor and the thermocouple is often referred to as a thermal converter. Usually these two elements are enclosed in a sealed container such as a small glass envelope. Normally the resistor is a high resistance wire and is so placed in an envelope that there is no electrical connection between it and the thermocouple, but there is a heat transfer path. The manufacturing of thermal converters that have a reverse D.C. current error of 0.01% or less is difficult to accomplish and normally the rejection rate of such thermal converters exceeds 90%.

The reverse D.C. current error is created by the requirement that the wire used to penetrate the glass envelope must have a low coefficient of thermal expansion. Unfortunately heating wires of materials which are desirable for joule, or resistance heating applications such as an alloy of copper and manganese have high coefficients of thermal expansion. Therefore a length of a good thermal resistance wire is placed in a glass envelope with a low coefficient lead wire such as a nickel steel, welded to each end and passing through the envelope. These two junctions and the body of the thermal resistance element introduce both Peltier and Thomson heating effects which are summed with the joule heating. The thermocouple utilizes the Seebeck effect to produce a voltage proportional to the temperature of the thermocouple junction in the envelope. Unlike joule heating these are dependent upon the direction of the current flow and thus cause dissymmetry of the temperature distribution along the heater wire which reverses when the direct current through the conductor is reversed. Thus when direct current passes through the thermal converter the voltage produced by the thermocouple will be at least slightly different than that produced with an alternating current of equal R.M.S. voltage because the reversal of even low frequency alternating current occurs so rapidly that the thermal inertia of the wire prevents such dissymmetry.

With such a high rejection rate the cost of the thermal converters which are found to be within the specified 0.01% limit and therefore usable is extremely high. If it were possible to use all the thermal converters manufactured their cost should be approximately one-tenth the cost of the presently usable thermal converters.

Temperature variations effecting the thermal converters have created a problem in maintaining the desired accuracy in earlier thermal transfer voltage standards. It has been found that a change in the temperature of the thermal converter may cause a substantial percentage error in the final voltage determination.

Therefore, it is an object of the present invention to provide a thermal transfer voltage standard in which substantially all manufactured thermal converters can be utilized, thus in effect creating almost a zero rejection rate.

Another object of the present invention is to provide a thermal transfer voltage standard in which variations in temperature create equal and compensating variations in the galvanometer circuit so that a variation in temperature in either the A.C. sensing thermal converter or the D.C. supply will not effect the accuracy of the voltage determination.

An additional object is to provide a new and improved thermal transfer voltage standard.

A principal object of the present invention is to provide as the thermal converter means in a thermal transfer voltmeter, a pair of thermal converters which have equal and opposing reverse D.C. current errors.

Yet another object is to provide two thermal converter means within a single enclosure which have their thermocouples connected in opposing polarities to a galvanometer so that when such a circuit is utilized as a thermal transfer voltage standard the variation in voltage caused by thermal changes to one thermal converter means will be balanced by the thermal change to the other converter means.

Further objects and advantages will become apparent from the following detailed description taken in connection with the accompanying drawings.

In the drawings:

FIGURE 1 is a schematic diagram of an embodiment of the present invention;

FIGURE 2 is an elevational view of a portion of an apparatus embodying the invention;

FIGURE 3 is an interior elevational view of the apparatus of FIGURE 2 taken along the lines 3—3;

FIGURE 4 is a sectional view of the apparatus of FIGURES 2 and 3 taken along the lines 4—4 in FIGURE 3; and FIGURE 5 is a schematic diagram of a modification of a portion of the circuit of FIGURE 1.

While this invention is susceptible of embodiments in many different forms, there is shown in the drawings and will herein be described in detail, an embodiment of the invention with the understanding that the present disclosure is to be considered as an exemplification of the principles of the invention and is not intended to limit the invention to the embodiment illustrated. The scope of the invention will be pointed out in the appended claims.

The embodiment of the invention shown in FIGURE 1 comprises a variable resistance means connected in series with thermal resistance elements of a thermal converter means, a direct current power source connected to a thermal resistive element of another thermal converter means and a galvanometer connected between the two thermal converter means for comparing the voltage output of these means. It will be recognized by those skilled in the art that the circuit illustrated comprises a new and unique thermal transfer voltmeter of such precision that it falls well within the class of precision instruments generally known in the art as thermal transfer voltage standards. The circuit illustrated by FIGURE 1 may be divided into five general portions, which are a variable resistance means, a thermal converter means whose thermal resistance elements are connected in series with the variable resistance means, a variable D.C.

source, another thermal converter means whose resistive element is connected to the D.C. current source and a means for comparing the voltage output of the two thermal converter means connected to these means. The thermal converter means connected in series with the thermal resistance elements will be referred to as the transfer converter means in the following description, and the thermal converter means whose resistance element is connected to the D.C. power source will be referred to as the temperature compensating converter means.

The transfer converter means differs from the prior art primarily in that it is composed of a pair of thermal converters instead of a single thermal converter. The temperature compensating transfer means is a new element in thermal transfer voltmeters since the prior practice has been to connect a D.C. current source directly to the means for comparing voltages. By utilization of the present invention it is now possible to construct thermal transfer voltage standards whose accuracy surpasses that of the prior art, being accurate to the order of .01%.

The circuit illustrated in FIGURE 1 will now be described in greater detail. A variable resistance means generally indicated at 10 is composed of three sets of resistors 11, 12 and 13 which are individually coaxially mounted in individual shield tubes. The three sets of resistors are of such individual value that when one resistor is selected from each set and connected in series they form a 143 ohm per volt multiplier string. The set 11 provides 10-volt steps; the set 12 provides 100-volt steps; and the set 13 provides 1-volt steps. Thus, by the selection of one resistor from each of the three sets, the 143 ohm per volt multiplier string may be varied in increments of 1 volt from 1 to 999 volts. The advantage of having one volt incremental settings permits the use of the instrument at its maximum resolution and sensitivity at 999 separate cardinal points over its operating range.

When a resistor is selected from each set they are connected in series by short solid parallel lines 14 and 15 and the resistor selected from the set 11 is connected to a switch 16 by a coaxial line 17.

A transfer thermal converter means generally indicated at 20 consists of a pair of thermal converters 21 and 22, a pair of resistors 23 and 24 forming a voltage divider and a resistor 25. The thermal converter 21 consists of a resistive element 26 composed of a copper and manganese alloy with nickel steel leads 27 and 28 connected at each end. A thermocouple 30 having leads 31 and 32 is enclosed within a glass envelope with the resistive element 26 so that there is a heat transfer path between the element 26 and the thermocouple to allow the thermocouple to have a rapid response to the heat generated by the resistance of the element which is proportional to the square of the electrical current flowing therein. The nickel steel leads 27 and 28 and the thermocouple leads 31 and 32 pass through sealed apertures of the sealed glass enclosure. The thermal converter 22 has a resistive element 33 composed of a copper and manganese alloy, a pair of nickel steel leads 34 and 35 connected to the resistive element 33, and a thermocouple 36 having a pair of leads 37 and 38 arranged in a similar construction to that of the thermal converter 21. The leads 28 and the leads 34 are connected to each other and the lead 27 is connected to the resistor 25 in order to form a series network, having a total resistance of 143 ohms, of the resistor 25, the resistive element 26 and the resistive element 33. Variations in the resistance elements of the pair of thermal converters are compensated for by making the appropriate change in the value of the resistor 25. The thermocouple leads 32 and 37 are joined together to allow the voltages produced by the thermocouples 30 and 26 to be additive. The total voltage produced by the two thermocouples at any time is placed across the voltage divider network consisting of the resistor 23 and the resistor 24 connected in series between the thermocouple lead 31 and the thermocouple lead 38.

A variable D.C. voltage source receiving a −105 D.C. voltage from a D.C. power supply (not shown) connected across the terminals 40 and 41, is composed of a D.C. amplifier 42, a balance control generally indicated at 43, a pair of resistors 58 and 59, and a pair of double anode Zener diodes 47 and 48. The balance control is composed of three variable resistances 44, 45 and 46 connected in parellel. The D.C. amplifier 42 is of the chopper modulated carrier type having a feedback circuit 49 around it. Since only a very small current can flow through the high impedance chopper in a conventional design of an operational D.C. amplifier, the feedback current in the feedback loop 49 is almost equal to the input current. The input current to the amplifier 42 is controlled by the three variable resistances 44, 45 and 46 connected in parallel. The resistors 58 and 59 and the two double anode Zener diodes 47 and 48 are connected across the terminals 40 and 41 to provide −6.2 volts to the balance control 43. The resistor 44 is a ten turn continuous variable potentiometer that varies the current to 1%. One percent steps from 0 to 9% are provided by the resistance 45 which is a ten position switch connected to metal film resistors. Ten percent steps from 50% to 120% are provided by the variable resistance 46 which is composed of wire wound precision resistors.

A temperature compensating thermal converter means generally indicated at 50 is composed of a single thermal converter having a resistor element 51, leads 52 and 53 attached to the end of the resistor element 51, a thermocouple 54 having leads 55 and 56 and a sealed glass envelope enclosing the thermocouple 54 and the resistance element 51 with the leads 52, 53, 55 and 56 passing through the sealed envelope. The resistive element 51 and a resistor 57 are connected in series in the feedback circuit 49 of the D.C. amplifier 42. Thus, controlling the input current to the amplifier 42 by manipulation of the balance control 43 will control the voltage developed across the thermocouple 54.

Referring to FIGURE 2, the transfer thermal converter means and the temperature compensating converter means are contained within a cylindrical module 60. Referring now to FIGURES 1 through 4 the module 60 is composed of a cylinder 61, an upper end 62 having a coaxial connector 63 rigidly mounted therein and a lower end 64 having a cable sealing device 65 rigidly mounted thereon. An inner cylinder 66 is rigidly secured to the upper end 62 and bolted to the lower end 64 by the studs 67 and 68 and the nuts 69 and 70. A set of screws generally indicated at 71 secure the upper end 62 to the cylinder 61 and a set of screws generally indicated at 72 secure the lower end 64 to the cylinder 61.

Referring specifically to FIGURES 3 and 4, a lead 73 of the resistor 25 is soldered to the center prong 74 of the coaxial connector 63. Another lead 75 of the resistor 25 is connected to the lead 27. As previously described, the resistor 25, the lead 27, the resistance element 26, the lead 28, the lead 34, the resistive element 33 and the lead 35 are all connected in series. The lead 35 is connected by a lead 76 through an aperture in the lower end 64 to a securing screw 77. As previously described, the thermocouples 30 and 36 are connected in series. The leads 31 and 38 are connected to the posts 78 and 79 which are electrically insulated from the inner cylinder 66.

As may be seen in FIGURE 3, the resistors 23, 24 and 57 are mounted on posts which are secured to the inner cylinder 66. The temperature compensating converter means 50 is inserted in a series of rubber grommets 80 which are glued to the inner cylinder 66. Thus, as shown schematically in FIGURE 1, the pair of thermal converters and the resistor 25 forming the thermal converter means 20 are conveniently mounted on an inner compartment of the module while the temperature compensating means 50 is mounted in close proximity to the means 20 with only a thin high heat conducting medium between them. Therefore, the temperature compensating converter means 50 may be considered to be in the same temperature environment as that of the transfer means 20. Leads from the temperature compensating thermal converter means 50 and from the voltage divider composed of resistors 23 and 24 are carried out through the cable sealing device 65.

Referring again to FIGURE 1, a means for comparing the voltage developed by the thermocouples 30 and 36 connected in series and the voltage developed by the thermocouple 54 is composed of a galvanometer 100, a switch 101 and a resistor 102. The switch 101 is composed of a contact arm 103 and three contacts 104, 105 and 106 to which the arm may be alternately switched to close an electrical circuit. The contact 104 is connected directly to a junction point 107 of the resistors 23 and 24 and the contact 106 is connected to junction 107 through the resistor 102. The contact 105 provides an "off" position for the switch arm 103, which is connected to one side of the galvanometer 100. The other side of the galvanometer 100 is connected to the lead 55 of the thermocouple 54 and, to complete the circuit, the lead 56 of the thermocouple 54 is connected to the other end of the resistor 24. When the switch 101 closes the circuit between the galvanometer and the contact 106, the resistance 102 reduces the sensitivity of the galvanometer 100 in order that a course adjustment may be made by manipulating the balance controls 43. When the switch 101 closes the circuit through the contact 104 a fine adjustment of the galvanometer may be obtained.

It can be noted from FIGURE 1 that the circuit composed of the variable resistance means 10 and the resistive elements 26 and 33, the circuit of the direct current source and the resistive element 51, and the circuit composed of the galvanometer and the thermocouples are grounded together at only one point. Since the thermocouples do not come into electrical contact with their respective thermal resistance elements, all ground loops are effectively eliminated. Therefore, the possibility of ground-loop currents creating inaccuracies in the operation of the present invention is almost non-existent.

A switch 110 is mechanically connected to the switch 16. An A.C. termnal 111 is connected to a contact 112 of the switch 16, another A.C. terminal 113 is connected to a terminal 114 of the switch 110. A D.C. terminal 115 is connected to the other contact 116 of the switch 16 and another D.C. terminal 117 is connected to the other contact 118 of the switch 110. Thus the switches 16 and 110 make it possible to connect the series circuit of the variable resistance means 10 and the resistance elements 26 and 33 across either an A.C. source or a D.C. source by a simple switching action.

Having described the circuit arrangement and structure of the principal components of the embodiment of the present invention, a brief description of its operation will now be given. An A.C. source whose R.M.S. value is to be determined is connected across the terminals 111 and 113. A variable D.C. source is connected across the terminals 115 and 117. The gang switches 16 and 110 are positioned to connect the A.C. source to the variable resistance means 10 and the resistance elements 26 and 33. A resistor from each of the three sets 11, 12 and 13 has been selected so that the total resistance of the three selected resistors will place the galvanometer 100 within its operating range. These resistors are connected in series with the leads 17, 15, 14, the resistance elements 26 and 33, and the resistor 25. The heat generated by the resistance elements 26 and 33 will be proportional to the square of the voltage applied across them. The switch 101 is placed in the "course" position and the balance controls 43 are manipulated until the galvanometer 100 is centered at its balance position. Unlike previous thermal transfer voltage standards the D.C. source is highly stable for short periods of time due to its Zener regulation. The switch 101 is then shifted to the fine position and the balance controls are again maipulated until the galvanometer is brought to its balanced position. At this point the voltage generated by the thermocouples 30 and 36 as taken from the voltage divider composed of resistor 23 and resistor 24 is equal to the voltage generated by the thermocouple 54. The gang switches 16 and 110 are then switched so that the D.C. source connected across the terminals 115 and 117 is connected across the variable resistance means 10 and the resistance elements 26 and 33. The voltage of the variable D.C. source connected to both the terminals 115 and 117 is then varied until the galvanometer is once again balanced. Then the voltage of this D.C. source is measured with a precision potentiometer. The resulting D.C. voltage reading is equal to the R.M.S. value of the A.C. source. Since both the transfer thermal converter means and the temperature compensating thermal transfer means are contained within the same module 60 any variation of the interior temperature will cause approximately compensating effects in the two converter means.

In the present invention it is possible to use all thermal converters which have a reverse D.C. current error of .1% or less by choosing a pair of thermal converters whose reverse D.C. current errors are equal and connecting them so that the errors oppose each other. Thus, they provide the same total voltage to the galvanometer with a D.C. current in either direction. In the past, it has been the general practice to reject all thermal converters whose error exceeded .01% since this .01% limit was believed to be required for use in thermal transfer voltage standard instruments. Thus the present invention has made it possible to use virtually all thermal converters manufactured instead of only approximately 10% of those manufactured.

It will be recognized by those skilled in the art that although the illustrated embodiment of the invention has the resistive elements 26 and 33 connected in series and the thermocouples 30 and 36 connected in series, either the resistive elements or the thermocouples, or both the elements and the thermocouples may be connected in parallel to counter-balance the reverse D.C. current errors. A parallel-parallel connection is illustrated in FIGURE 5 where the thermal converter means comprises a pair of thermal converters 21' and 22'. Thermal resistance elements 26' and 33' are connected in parallel, with the reverse D.C. current errors of the elements opposing, reducing the effective error for the combination. Thermocouples 30' and 36' are also connected in parallel, with their output currents additive. Also the use of three or more thermal converters with their resistive elements and thermocouples connected in various series-parallel combinations to balance out the errors is within the scope of the present invention.

We claim:

1. In a thermal current measuring system, a thermal converter means comprising a plurality of thermal converters each having a thermocouple and a thermal resistance element inside an envelope with lead wires for said resistance element extending through the envelope and of a material different than that of the resistance element, the resistance element having a temperature due to current flow of one polarity through the lead wires and element which is different from the temperature for the same value current flow of the opposite polarity through the lead wires and element, giving rise to a reverse D.C. current error, each thermocouple having a D.C. output, the resistance elements of the converters being connected with their reverse D.C. current errors in opposition, and said thermocouples being connected with their D.C. outputs aiding, whereby the combined D.C. outputs of the thermal converters are relatively insensitive to the direct current polarity of the current through the resistance elements.

2. The thermal converter means of claim 1 wherein said thermal resistance elements are connected in series and said thermocouples are connected in series.

3. The thermal converter means of claim 1 wherein said thermal resistance elements are connected in series.

4. The thermal converter means of claim 1 wherein said thermal resistance elements are connected in parallel.

5. The combination of a plurality of voltage sources, a variable resistance means, a thermal converter means consisting of a pair of thermal converters each having a thermocouple and a thermal resistance element inside an envelope with lead wires for said resistance element extending through the envelope and of a material different than that of the resistance element, the resistance element having a temperature due to current flow of one polarity through the lead wires and element which is different from the temperature for the same value current flow of the opposite polarity through the lead wires and element, giving rise to a reverse D.C. current error, each thermocouple having a D.C. output, the resistance elements of the converters being connected with their reverse D.C. current errors in opposition, and said thermocouples being connected with their D.C. outputs aiding, whereby the combined D.C. outputs of the thermal converters are relatively insensitive to the direct current polarity of the current through the resistance elements, said thermal resistance elements being connected in series with said variable resistance, the combination being selectively connected with one of said sources, a third thermal converter having a thermal resistance element and a thermocouple and a variable direct current source connected to said thermal resistance of said third thermal converter, and a galvanometer connected to the serially connected thermocouples of said pair of thermal converters and connected to the thermocouple of said third thermal converter for receiving opposing voltages, said thermal converter means and said third thermal converter being in a common temperature environment.

References Cited by the Examiner

UNITED STATES PATENTS

| | | | |
|---|---|---|---|
| 1,121,835 | 12/1914 | Hiatt | 324—98 |
| 1,390,743 | 9/1921 | Allcutt | 324—106 |
| 1,505,497 | 8/1924 | Roller | 324—106 |
| 1,731,239 | 10/1929 | Affel | 324—106 |
| 1,934,595 | 11/1933 | Fischer | 324—106 |
| 2,301,612 | 11/1942 | Brown | 324—106 |
| 2,398,606 | 4/1946 | Wang | 324—106 |
| 3,052,846 | 9/1962 | Hill | 324—105 |
| 3,093,732 | 6/1963 | Clark | 324—106 |

WALTER L. CARLSON, *Primary Examiner.*

BENNETT G. MILLER, *Examiner.*

R. V. ROLINEC, *Assistant Examiner.*